United States Patent [19]
Heister et al.

[11] Patent Number: 5,314,213
[45] Date of Patent: May 24, 1994

[54] PIPE COUPLING

[75] Inventors: Aloisius H. M. Heister, Enschede; Andreas J. L. Nijsen, Weerselo, both of Netherlands

[73] Assignee: Georg Fischer N.V., Epe, Netherlands

[21] Appl. No.: 13,142

[22] Filed: Feb. 1, 1993

Related U.S. Application Data

[63] Continuation of Ser. No. 582,258, Sep. 13, 1990, abandoned.

[30] Foreign Application Priority Data

Sep. 14, 1990 [NL] Netherlands .................. 8902306

[51] Int. Cl.$^5$ ............................. F16L 37/26
[52] U.S. Cl. ....................... 285/231; 285/177; 285/337; 285/369; 285/918
[58] Field of Search ............ 285/337, 318, 340, 104, 285/105, 231, 364, 918, 177

[56] References Cited

U.S. PATENT DOCUMENTS

| | | | |
|---|---|---|---|
| 2,201,372 | 5/1940 | Miller | 285/337 X |
| 2,444,380 | 6/1948 | Shimek | 285/340 |
| 3,218,095 | 11/1965 | Wiltse | 285/318 |
| 3,712,647 | 1/1973 | Stecher | 265/318 |
| 3,865,410 | 2/1975 | Chen | 285/337 X |
| 4,848,805 | 7/1989 | Bucher et al. | 285/105 |

FOREIGN PATENT DOCUMENTS 1490680 8/1967 France .................. 285/104

Primary Examiner—Dave W. Arola
Attorney, Agent, or Firm—Bauer & Schaffer

[57] ABSTRACT

A pipe coupling, comprising a sleeve having at least one end adapted for the insertion of a pipe and being provided with a substantially conically shaped supporting surface for a sealing ring. A compression ring is provided by which the sealing ring may be compressed around the pipe. The sealing ring is composed of a circumferentially compressible, but in cross section rather undeformable annular core, which is more particularly bent of a helical body having substantially circular windings, and a sheath of elastomeric material which forms the actual seal. The sheath completely encloses the annular core both cross sectionally and circumferentially. The supporting surface has a progressively decreasing diameter in the pressing direction.

3 Claims, 2 Drawing Sheets

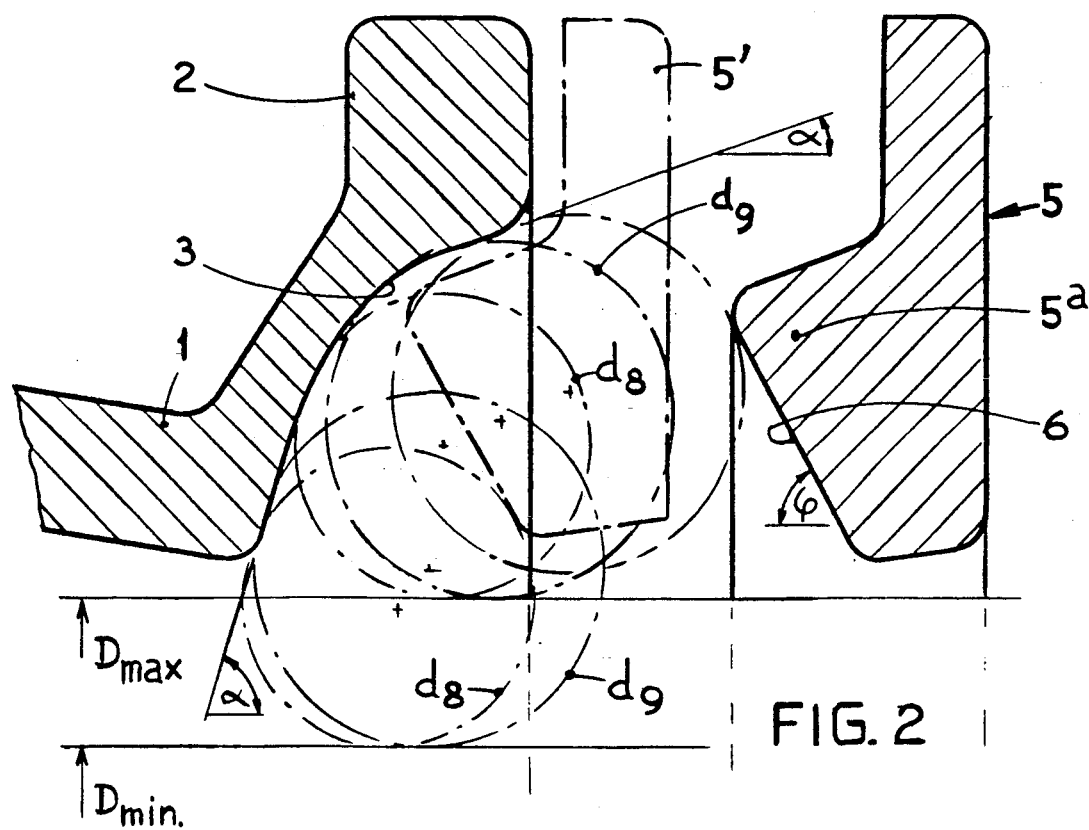
FIG. 2
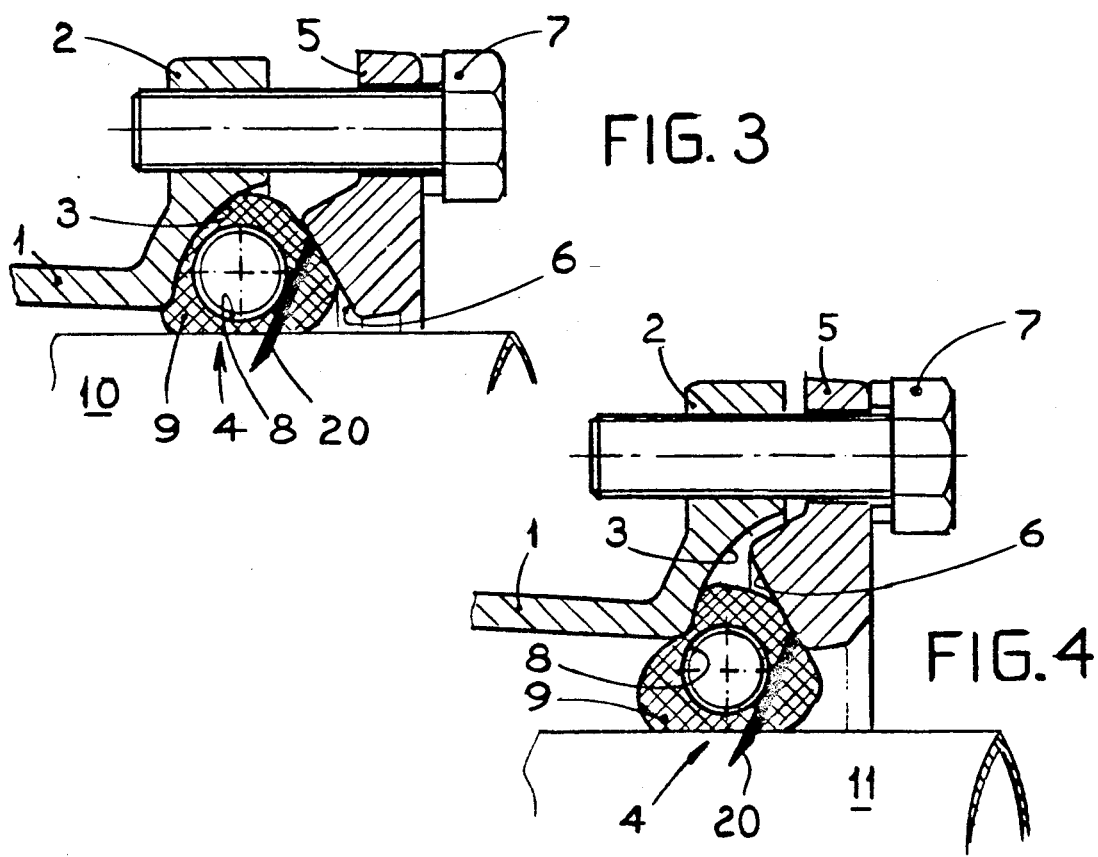
FIG. 3
FIG. 4

PIPE COUPLING

This is a continuation of Ser. No. 07/582,258 filed Sep. 13, 1990, and now abandoned.

FIELD OF THE INVENTION

The invention relates to a pipe coupling, comprising a sleeve having at least one end adapted for the insertion of a pipe and means for clamping the pipe in place.

In particular, the one end is provided with a substantially conically shaped surface for supporting a sealing ring and with a pressure ring by means of which, in cooperation with the supporting surface, the sealing ring may be compressed around the pipe inserted into the sleeve. The sealing ring is composed of a circumferentially compressible but in cross section substantially undeformable annular core, preferably being an annular core of a helical body having substantially circular windings, and a sheath of elastomeric material which forms the actual sealing ring completely enclosing the annular core both cross sectionally and circumferentially.

BACKGROUND OF THE INVENTION

Such a pipe coupling is known from FR-A-2.072.296 (corresponding to U.S. Pat. No. 3,712,647), showing a sealing ring having a sealing sheath which encloses the helical core annulus both in circumferential and cross section direction. More particularly, it shows a construction with which the sealing sheath does not completely enclose the core annulus, so that a circular slit is formed on one axial end of the ring.

It has now been found that the construction in which the core annulus is completely enclosed by the sealing sheath also in the cross section plane, is particularly suitable for use in conjunction with a sleeve, which is designed to accomodate and interconnect pipes of various diameters. This construction is more particularly suitable for bridging the differences in outer diameter occurring with pipes of the same nominal diameter (i.e: inner diameter) but formed of different material. It is considered that with a sealing ring having such a sealing sheath, in contrast to an embodiment having a slit on on axial end of the ring, it is easier to tangentially compress the ring in a uniform manner.

Based on this insight, it is the aim of the present invention to provide an improved sleeve portion so as to take maximum advantage of the wide limits of use of the selected sealing ring, while keeping the cross sectional diameter of the sealing ring relatively small (which means a relatively thin sealing ring).

SUMMARY OF THE INVENTION

According to the present invention, this aim is achieved in that the supporting surface has a progressively decreasing diameter as seen in the direction of compression. This means that the supporting surface is slightly concave in shape and consequently shows an increasing taper as seen in the compression direction.

When pressing a sealing ring against the supporting surface of such a sleeve, the supporting surface will initially exert a relatively reduced force onto the sealing ring in a direction parallel to the axis of the pipe to be coupled, while a rather large reaction force is exerted towards the axis of the pipe. As a result of this, the sealing ring may be easily compressed to a smaller diameter. Since the sealing ring according to the invention, on the average, has to contract to a rather large extent, this is not only a practical advantage but also enables building a uniform and, therefore, reliable sealing pressure around the pipe to be sealed.

Furthermore, with a given pressing force exerted by the compression ring, the sealing pressure reaches its maximum with the maximum pipe diameter from which the coupling and the sealing ring are designed. This is to be seen as an advantage as the tendency of the tube to slide through the sealing ring under the influence of the pressure within the coupling is at the maximum with the maximum pipe diameter. Consequently, the invention also improves the tensile strength of the coupling.

In a preferred embodiment the sheath is provided, at its axial end facing the compression ring, with a conically shaped bearing surface, which is complementary to the conically shaped pressing surface of the compression ring. This prevents the sealing ring from "rolling" about its circular axis.

Further features of the invention will be hereinafter explained by way of example with reference to the drawing.

BRIEF DESCRIPTION OF THE DRAWINGS

FIG. 2 is a cross sectional view of a detail of the conical supporting surface of the invention and the pressing surface of the pressing ring cooperating therewith;

FIG. 3 is a fragmentary, cross sectional view in which the sealing ring is shown in a contracted state around a pipe of the maximum diameter; and FIG. 4 is a detailed view similar to that of FIG. 3, showing the same sealing ring, but now compressed around a pipe, the diameter of which corresponds to the minimum diameter.

DESCRIPTION OF THE INVENTION

Figure 1:
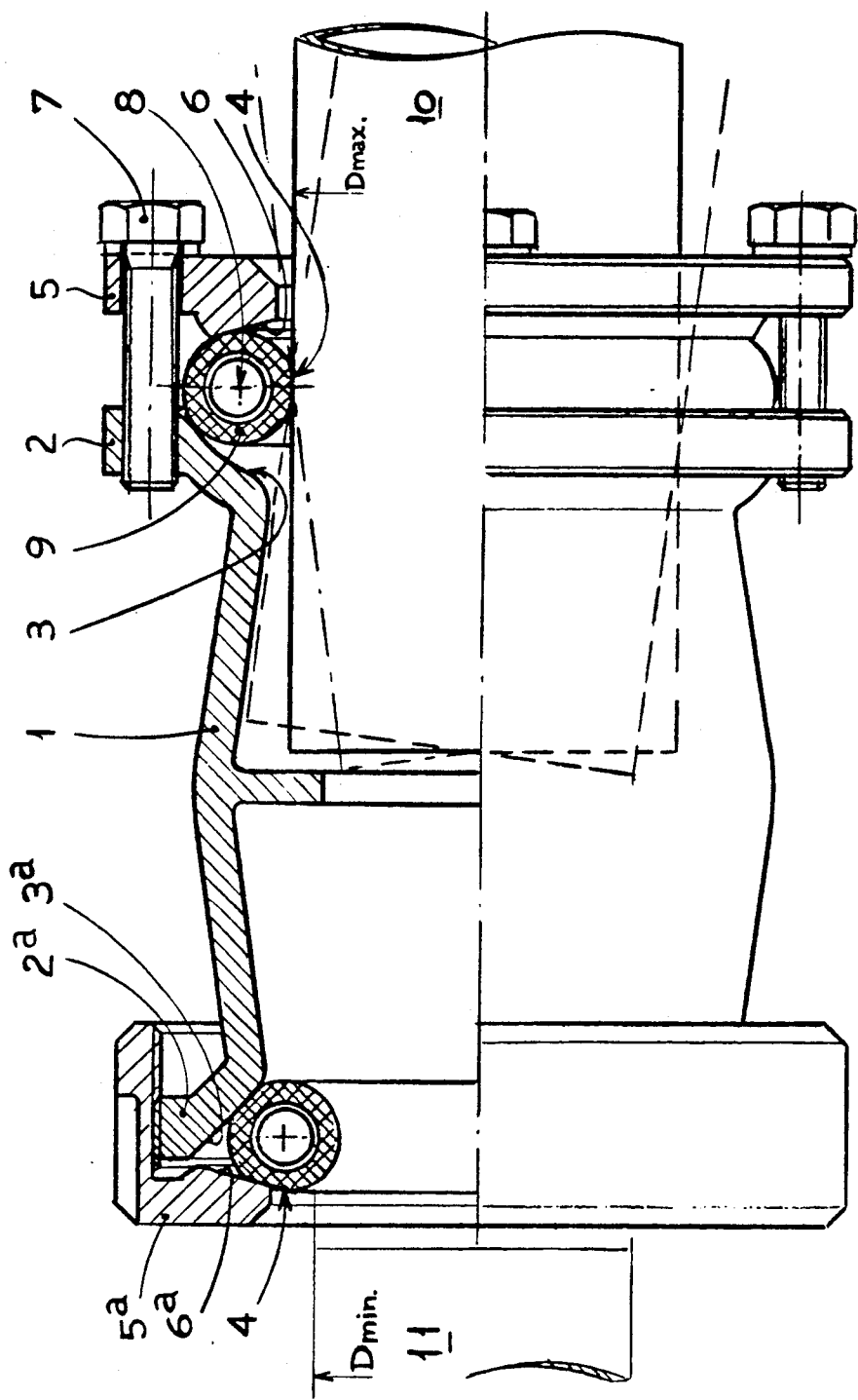
FIG. 1 is a longitudinal cross sectional view of a straight pipe coupling according to the invention, which is designed to connect two pipe sections of different diameters, the conical supporting surface in the right half of the coupling being shaped in accordance with the invention.

A straight pipe coupling or connecting sleeve of a type well-known per se, by means of which a pair of pipes 10 and 11 can be coupled is seen in FIG. 1. The sleeve has a diameter which may vary between a value Dmax and a value Dmin. Flanges 2 and 2a, respectively, are provided at either end of the sleeve 1. The flanges have a conically shaped supporting surface 3 and 3a bearing against a sealing ring 4 and 4a, respectively surrounding the tubes 10 and 11. A compression ring 5, provided with a rather steep conical pressing surface 6 and a fastening bolt 7, is provided to compress the sealing ring 4 on the right side as seen in the drawing against the conical supporting surface 3. At the left end of the connecting sleeve 1 a nut-shaped pressing ring 5a is used to compress the sealing ring 4a.

The sealing rings 4 and 4a, respectively, have a core 8 and a sheath 9 of an elastomeric material, e.g. a suitable rubber, to completely enclose said core and form the sealing ring properly. The core 8 is formed by a helical spring, which has been bent into an annulus. One may start from a straight helical spring of a length which corresponds with the desired diameter in untensioned state and thereafter interconnect the free ends in a suitable manner.

The sheath 9 has a relatively small thickness, which, dependent on the diameter of the sealing ring, amounts to 5-20% of the (average) diameter of the cross section of the sealing ring.

For the manufacture of the sealing ring one may start using a straight piece of a hose of uncured or not completely cured rubber. The piece of hose may be cut to desired length from a continuous hose and the helical spring, adapted to function as the core, is inserted into the piece. After which, the assembly is bent into a closed annulus, the free ends of the spring interconnected and the hose ends slid over one another at a given distance. The sealing ring is then ready for curing in a suitable mold according to the usual techniques. During curing the thickened material, formed by the superimposed free hose ends, is caused to flow out so that finally a sealing ring is obtained having a uniform cross sectional shape over its entire circumference. During curing the elastomeric sheath 9 of the sealing ring 4 is also provided at the one axial end adapted to face, in use, towards the compression ring 5, with a conical surface which is complementary to the conically shaped pressing surface 6.

As a result of the properties of the helical spring-core 8 and also of the rather slight thickness of the sheath 9, the sealing ring may, in principle, be compressed rather easily to a smaller diameter. Due to the rather easy compressibility in the circumferential direction one sealing ring may, in principal, be used for sealing the entire diameter range Dmin - Dmax of the coupling. The right half of FIG. 1 is illustrative of the case in which the diameter of the pipe 10 to be connected has the maximum value for which the coupling is designed. In this case the sealing ring 4 needs to be circumferentially compressed to a small extent only. In the left half of FIG. 1, however, the case is illustrated in which the pipe 11 to be coupled has a diameter corresponding to the minimum diameter for which the coupling is designed. In this case the sealing ring has to be circumferentially compressed to such an extent that the spaces between the successive windings of the core annulus 9 are substantially closed. As shown in the drawing, the sealing ring 4a may be circumferentially compressed even beyond Dmin, without resulting in a substantial change in cross sectional shape of the sealing ring.

While in the left half of FIG. 1 both the pressing surface 6a and the supporting surface 3a have, as according to the prior art, a straight cross sectional form, and the right half of FIG. 1 represents the specific form of the conical supporting surface 3 in accordance with the present invention. As shown (vide also FIG. 2), this supporting surface 3 is slightly concave in shape as seen towards (radially of) the axis of the coupling, the diameter of which progressively, rather than proportionately, decreases as seen in the direction of pressing of the compressing ring.

FIG. 2 illustrates the increases of the taper α of the supporting surface 3 from e.g. 20 degrees at the outer circumference to e.g. 75 degrees at the inner circumference, while the pressing surface 6 of the pressing ring 5 has a constant taper δ e.g. 60 degrees. Also, the pressing surface 6 is formed on an axially projecting "nose portion" 5a due to which the compression ring may be moved into the space surround by the concave-conical supporting surface 3.

In the initial position of the compression ring 5 indicated by the full lines in FIG. 2, the undeformed sealing ring 4, having a cross sectional diameter d9, just touches the supporting surface 3 and the pressing surface 6. At the dotted line position 5', the compression ring is indicated at its innermost position. This position is determined by the circumferentially compressed core-cross sectional circle d8 just contacts the supporting surface 3 as well as the pressing surface 6 and corresponds to the smallest pipe diameter Dmin.

The effect of the concave-conical shape of the supporting surface 3 is that when pressing the sealing ring 4, the latter will be initially subjected to a relatively large force component directed to the axis and as a consequence of this may be easily compressed in the circumferential direction. This provides for a better balance between the sealing pressures acting on the conical surface 3 on one hand and on the pipe 10 and 11, respectively, on the other hand.

FIG. 3 illustrates how the sealing ring 4, starting from the initial stage in FIG. 1 (to the right) will finally become clamped around a pipe 10 of the maximum diameter (Dmax) by means of the pressing ring 5. Typically, the helical spring/core annulus 8 maintains its original cross sectional shape, whereas the sheath 9 has "conformed", to a large extent, to the surfaces 3, 6 and the pipe surface.

In FIG. 4 it is shown how the same sealing ring will finally clamp onto a tube 11 of minimum diameter Dmin. Again, the helical spring/core annulus 8 substantially keeps its original circular cross sectional shape, whereas the sheath 9 has "conformed", to a still larger extent, to the surfaces 3, 6, the pipe surface, and to the surface of the sleeve section 1 adjoining the supporting surface 3.

FIG. 3 and 4 also show a further embodiment of the sealing ring according to the invention in which the ring is provided with a number of circumferentially spaced, hook-like elements 20 of e.g. metal in the sheath 9, said elements being caused to bite into the surface of the pipe 10, 11 to be coupled when the sealing ring 2 is circumferentially compressed so as to increase the tensile strength of the coupling still further.

These hook-like elements do not interfere with the circumferential compressibility of the sealing ring. They may be applied also on the side of the sealing ring which is turned away from the pressing ring, when a pressure resistance connection between sleeve portion and pipe is desired as well.

In the example shown, the elements 20 bear with their outer ends against the conically shaped pressing surface 6 of the pressure ring 5. This embodiment has the advantage that the elements are compressed by the pressing ring 5 into the material of the tube to be connected in a direct manner.

Hereinabove, as well as in the attached claims, the term "sleeve portion" has to be widely interpreted and is meant to cover also curved sleeves, T-joints and connecting sockets of fittings and accessories.

We claim:

1. A pipe coupling comprising a sleeve having at least one end adapted for the insertion of a pipe, said sleeve having a longitudinally said at least one end having a concave supporting surface and a pressure ring having a pressing surface and being adjustably movable in opposition to said supporting surface, a sealing ring of substantially circular outer cross-section located about the pipe and between said supporting surface and said pressure ring pressing surface, said sealing ring comprising an annular core formed of a helically wound spring, said spring being enclosed in a sheath of elastomeric material, the circumference of the windings of said spring being expandable and contractible within said sheath and substantially undeformable in cross-section under compression, said supporting surface being conically shaped and having a progressively decreasing diameter in the direction of compression thereby defining an increasing taper relative to said longitudinal axis increasing from said at least one end toward said longitudinal axis and means for forcing said pressure ring pressing surface against said sealing ring to compress said annular core and said sheath about the pipe and to conform said outer sheath to the outer surface of the pipe and said pressing and supporting surfaces.

2. The coupling according to claim 1, wherein said taper of said supporting surface increases from about 20 degrees to about 75 degrees in respect to a diametric plane parallel to said longitudinally axis and passing through said sheath and the pressure ring has a surface having a constant taper of about 60 degrees relative to said longitudinal axis.

3. The coupling according to claim 1, wherein hook members are embedded in said elastomeric sheath, said hooks being adapted to bit into the wall of the pipe upon said compression of said sealing ring.

* * * * *

UNITED STATES PATENT AND TRADEMARK OFFICE
CERTIFICATE OF CORRECTION

PATENT NO.   :   5,314,213
DATED        :   May 24, 1994
INVENTOR(S)  :   Heister et al.

It is certified that error appears in the above-identified patent and that said Letters Patent is hereby corrected as shown below:

Claim 1, Column 5, line 60:   replace "longitudinally" with --longitudinal axis,--.

Claim 2, Column 6, line 6:   replace "longitudinally" with --longitudinal--.

Claim 3, Column 6, line 12:   replace "bit" with --bite--.

Signed and Sealed this

Thirtieth Day of August, 1994

*Attest:*

BRUCE LEHMAN

*Attesting Officer*    *Commissioner of Patents and Trademarks*